United States Patent [19]

Tsuruoka et al.

[11] Patent Number: 4,590,528

[45] Date of Patent: May 20, 1986

[54] MAGNETIC RECORDING AND/OR REPRODUCING APPARATUS OPERABLE WITH AN ADAPTER FOR A MINIATURE TYPE TAPE CASSETTE

[75] Inventors: Mitsuharu Tsuruoka, Kodaira; Keiji Sasaki, Sagamihara, both of Japan

[73] Assignee: Victor Company of Japan, Ltd., Yokohama, Japan

[21] Appl. No.: 601,495

[22] Filed: Apr. 18, 1984

[30] Foreign Application Priority Data

| Apr. 19, 1983 | [JP] | Japan | 58-68895 |
| Apr. 20, 1983 | [JP] | Japan | 58-69707 |
| Apr. 20, 1983 | [JP] | Japan | 58-69708 |
| Jun. 7, 1983 | [JP] | Japan | 58-101527 |
| Jun. 29, 1983 | [JP] | Japan | 58-117964 |

[51] Int. Cl.$^4$ .......................... G11B 5/78; G11B 15/66
[52] U.S. Cl. ............................................. 360/94; 360/85
[58] Field of Search ............................. 360/85, 94, 137

[56] References Cited

U.S. PATENT DOCUMENTS

| 3,922,715 | 11/1975 | Negishi et al. | 360/94 |
| 3,964,099 | 6/1976 | Sato | 360/94 |
| 4,432,510 | 2/1984 | Ogata et al. | 360/94 |
| 4,477,850 | 10/1984 | Ogata et al. | 360/94 |

Primary Examiner—Stuart N. Hecker
Assistant Examiner—Matthew J. Bussan
Attorney, Agent, or Firm—Michael N. Meller

[57] ABSTRACT

A magnetic recording and/or reproducing apparatus records and/or reproduces a signal on and/or from a magnetic tape within a miniature type tape cassette which is smaller than a standard type tape cassette, when loaded with an adapter which has a shape approximately the same as the shape of the standard type tape cassette and accommodates therein the miniature type tape cassette. The recording and/or reproducing apparatus comprises an inserting opening through which the adapter is inserted, an adapter housing for holding the adapter which is inserted through the inserting opening, a moving mechanism for moving the adapter housing between a first position opposing the inserting opening and a second position where the adapter is loaded into the recording and/or reproducing apparatus, through a predetermined position, a control circuit for controlling the operation of the moving mechanism so that the adapter housing is selectively stopped at the predetermined position, and an opening located at a position so as to enable access to the adapter housing in the predetermined position. The miniature type tape cassette is inserted into and removed from the adapter through the opening.

9 Claims, 13 Drawing Figures

MAGNETIC RECORDING AND/OR REPRODUCING APPARATUS OPERABLE WITH AN ADAPTER FOR A MINIATURE TYPE TAPE CASSETTE

BACKGROUND OF THE INVENTION

The present invention generally relates to magnetic recording and/or reproducing apparatuses operable with adapters for miniature type tape cassettes, and more particularly to a magnetic recording and/or reproducing apparatus which is conveniently arranged for carrying out recording and/or reproduction by use of an adapter for accommodating the miniature type tape cassette, with respect to the miniature type tape cassette which is smaller than a standard type tape cassette.

A tape cassette which is smaller than a standard type tape cassette, was previously proposed in a U.S. patent application Ser. No. 339,671 filed Jan. 15, 1982, now U.S. Pat. No. 4,432,510, in which the assignee is the same as the assignee of the present application. Further, an adapter for the miniature type tape cassette, which is used when loading the miniature type tape cassette into a standard type recording and/or reproducing apparatus, was previously proposed in a U.S. patent application Ser. No. 340,105 filed Jan. 18, 1982, now U.S. Pat. No. 4,477,850, in which the assignee is the same as the assignee of the present application. The adapter was designed to accommodate the miniature type tape cassette. When a tape loading operation was performed with respect to the miniature type tape cassette accommodated within the adapter, a predetermined tape path was formed at the front of the adapter. This predetermined tape path at the front of the adapter, corresponded to the tape path at the front of the standard type tape cassette. The adapter accommodating the miniature type tape cassette and having the predetermined tape path at the front thereof, was loaded into a standard type recording and/or reproducing apparatus as in the case of the standard type tape cassette.

A conventional standard type recording and/or reproducing apparatus, was not conveniently arranged for playing the adapter which accommodates the miniature type tape cassette. Thus, when the operator wanted to change the miniature type tape cassette which is being played on the conventional standard type recording and/or reproducing apparatus to another miniature type tape cassette, the adapter had to be once unloaded from the standard type recording and/or reproducing apparatus. Then, the miniature type tape cassette accommodated within the unloaded adapter was changed to the other miniature type tape cassette, and the adapter accommodating the other miniature type tape cassette was again loaded into the standard type recording and/or reproducing apparatus. Hence, especially when the miniature type tape cassette accommodated within the adapter had to be changed successively a plurality of times, it was necessary to repeat an operation in which the adapter is unloaded from the standard type recording and/or reproducing apparatus, the miniature type tape cassette accommodated within the unloaded adapter is changed to a different miniature type tape cassette, and the adapter accommodating the different miniature type tape cassette is again loaded into the standard type recording and/or reproducing apparatus. Therefore, there was a problem in that it was necessary to perform troublesome operations in order to successively play a plurality of miniature type tape cassettes on the conventional standard type recording and/or reproducing apparatus by use of the adapter.

Further, there was a problem in that the miniature type tape cassette accommodated within the adapter could not be changed quickly, because the loaded adapter had to be once unloaded from the conventional standard type recording and/or reproducing apparatus in order to change the miniature type tape cassette. As a result, the recording and/or reproduction was interrupted for a long period of time while the miniature type tape cassette was being changed.

SUMMARY OF THE INVENTION

Accordingly, it is a general object of the present invention to provide a novel and useful magnetic recording and/or reproducing apparatus operable with an adapter for a miniature type tape cassette, in which the problems described heretofore have been eliminated.

Another and more specific object of the present invention is to provide a magnetic recording and/or reproducing apparatus having an opening for making access to a miniature type tape cassette accommodated within an adapter which is loaded into the magnetic recording and/or reproducing apparatus, in addition to an inserting opening through which the adapter is loaded into the magnetic recording and/or reproducing apparatus. According to the apparatus of the present invention, it is possible to accommodate and remove the miniature type tape cassette into and from the adapter which is loaded into the apparatus, through the opening of the apparatus. In other words, it is possible to change the miniature type tape cassette which is to be played, in a state where the adapter is loaded into the apparatus. Thus, it is unnecessary to perform the troublesome operation of once unloading the loaded adapter from the apparatus in order to change the miniature type tape cassette. Hence, the apparatus according to the present invention is especially useful when successively playing a plurality of miniature type tape cassettes. Moreover, an interval in which the recording or reproduction is interrupted while the miniature type tape cassette is being changed, is reduced compared to the interval in which the recording or reproduction is interrupted while the miniature type tape cassette is changed in the conventional standard type recording and/or reproducing apparatus.

Other objects and further features of the present invention will be apparent from the following detailed description when read in conjunction with the accompanying drawings.

BRIEF DESCRIPTION OF THE DRAWINGS

FIGS. 12(A) through 12(H) show signal waveforms at terminals shown in FIG. 11 during each mode of the apparatus, and FIG. 12(I) explains forward rotation, reverse rotation, and stopped states of a motor.

DETAILED DESCRIPTION

Figure 1:
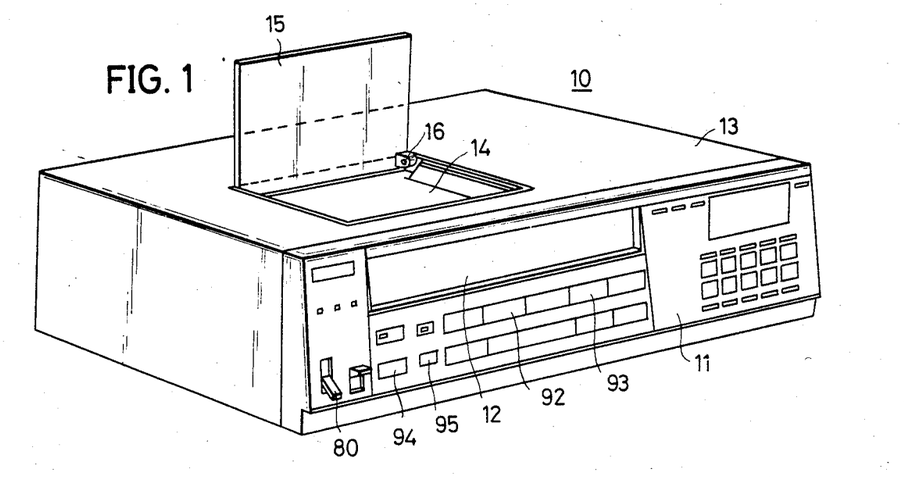
FIG. 1 is a perspective view showing an embodiment of a magnetic recording and/or reproducing apparatus operable with an adapter for a miniature type tape cassette according to the present invention, in a state where a cover at an opening of the apparatus is open.
Figure 3:
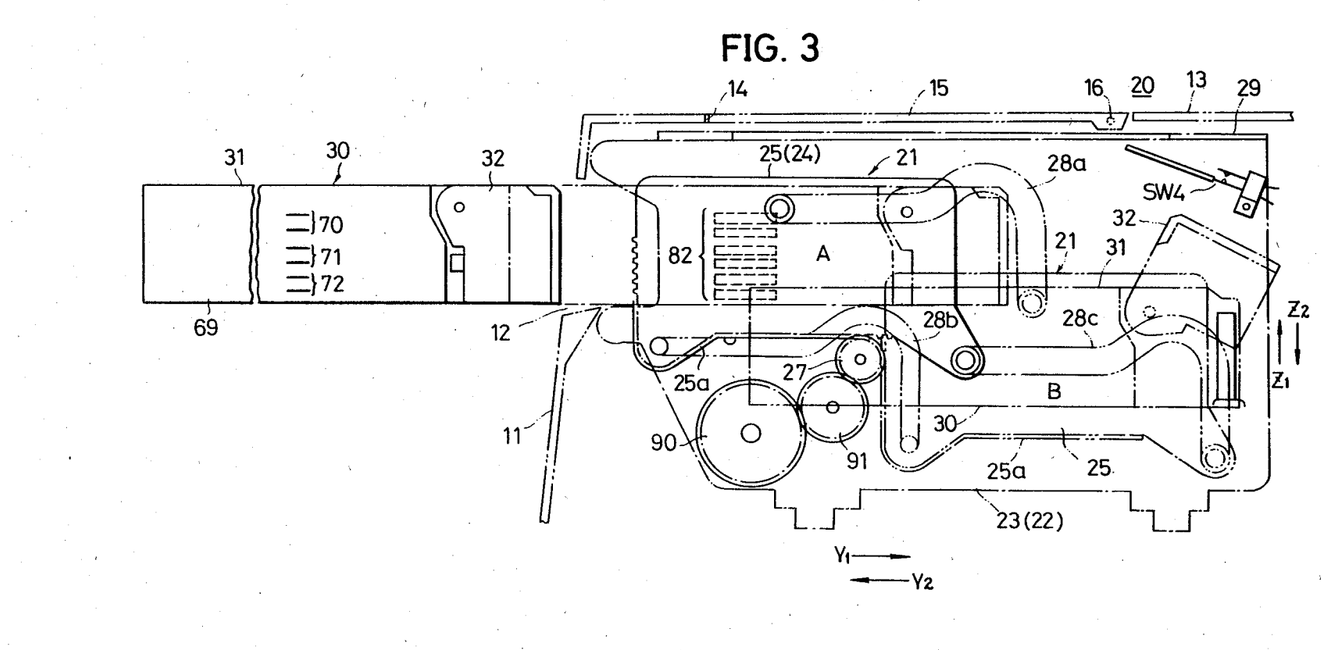

FIG. 1 shows an embodiment of a magnetic recording and/or reproducing apparatus 10 according to the present invention, which is operable with an adapter for a miniature type tape cassette. The apparatus 10 comprises a front panel 11 and a top plate 13. The front panel 11 has an inserting opening 12 through which an adapter (or a standard type tape cassette) is inserted, and the top plate 13 has an opening 14 through which a miniature type tape cassette may be removed and inserted. A cover 15 is pivotally supported by a pin 16 which is located at a rear thereof, and is designed to cover the opening 14. Normally, the cover 15 is closed as shown in FIG. 3. The cover 15 is opened when removing and inserting the miniature type tape cassette.

Figure 2:
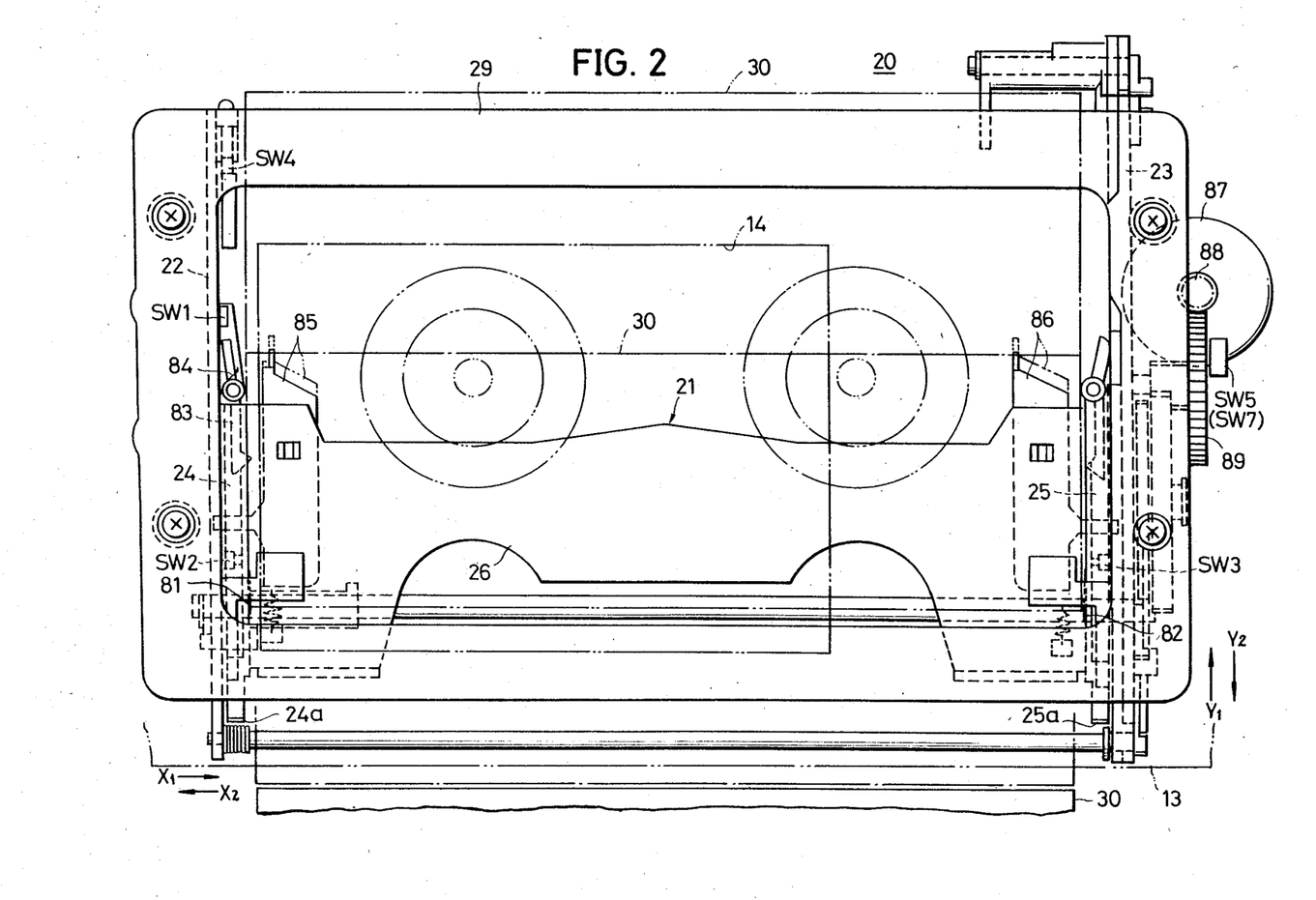
FIGS. 2 and 3 are a plan view and a side view, respectively showing an adapter loading and unloading mechanism assembled within the apparatus shown in FIG. 1, in correspondence with the adapter.
Figure 10:
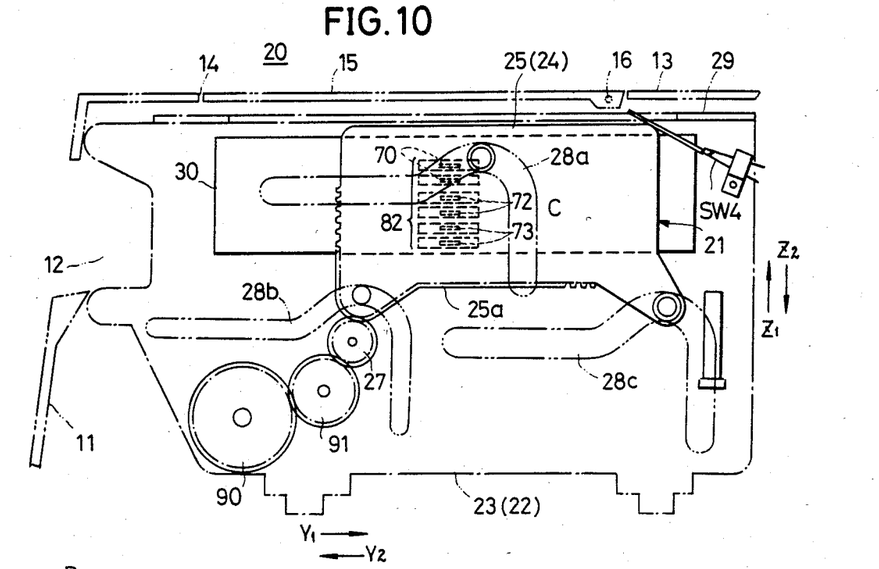

An automatic adapter (or tape cassette) loading and unloading mechanism 20 shown in FIGS. 2 and 3, is assembled within the apparatus 10. The loading and unloading mechanism 20 is substantially the same as the loading and unloading mechanism which was previously proposed in a U.S. patent application Ser. No. 573,874 filed Jan. 25, 1984. The loading and unloading mechanism 20 generally comprises an adapter housing 21 which is movably disposed between right and left vertical support plates 23 and 22. The adapter housing 21 is a frame body made up of right and left side plates 25 and 24, and a bottom plate 26 connecting to the side plates 24 and 25. L-shaped rack gears 24a and 25a which are formed on the respective side plates 24 and 25, are driven by a pinion 27 (motor 87). Thus, the adapter housing 21 is guided by guide grooves 28a, 28b, and 28c of the vertical support plate 23 and corresponding guide grooves (not shown) of the vertical support plate 22, and moves between an adapter (tape cassette) inserting and extracting position A and an adapter (tape cassette) loading position B, through a miniature type tape cassette accommodating and removing position C shown in FIG. 10. The position C of the adapter housing 21 is detected by a switch SW4, and the adapter housing 21 is stopped at the position C according to the needs.

Figure 4:
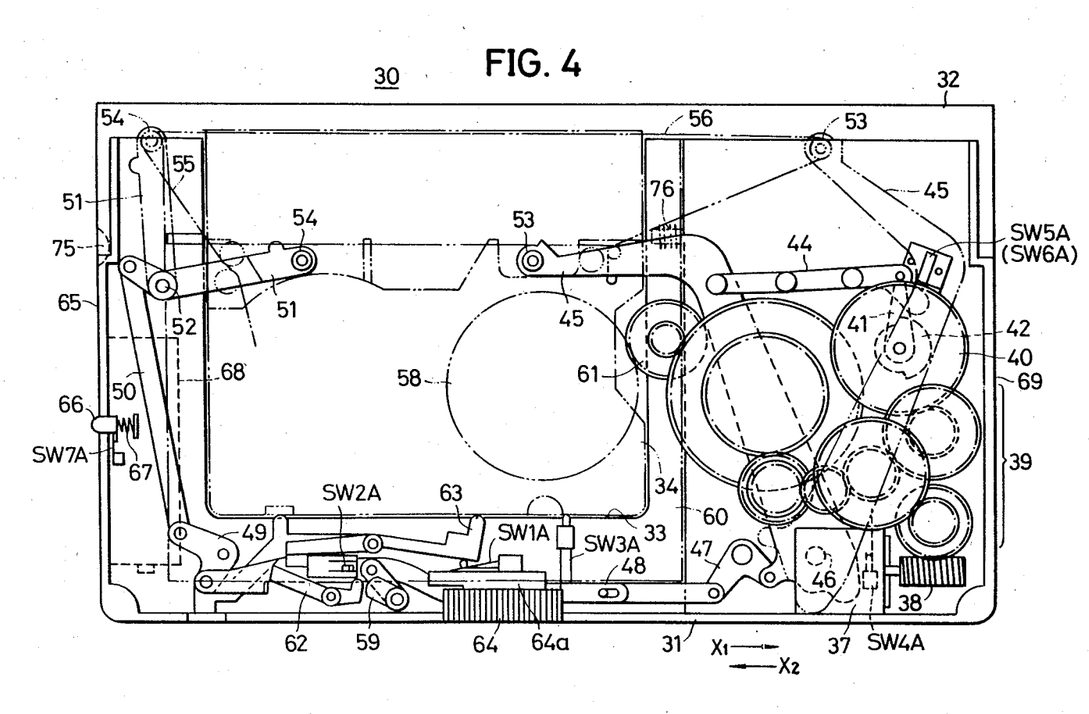
FIG. 4 is a plan view showing an example of the adapter for a miniature type tape cassette which is used with the apparatus shown in FIG. 1, with an upper plate thereof removed.

The position C is selected so that a top cover 60 of an adapter 30 shown in FIG. 4 which is inserted within the adapter housing 21, opposes the opening 14 in the top plate 13 of the apparatus 10 at this position C. As will be described later on in the specification, the miniature type tape cassette within the adapter 30, is changed when the adapter housing 21 assumes the position C. A frame plate 29 which is open in the central part thereof, is mounted on top of the vertical support plates 22 and 23.

Figure 11:
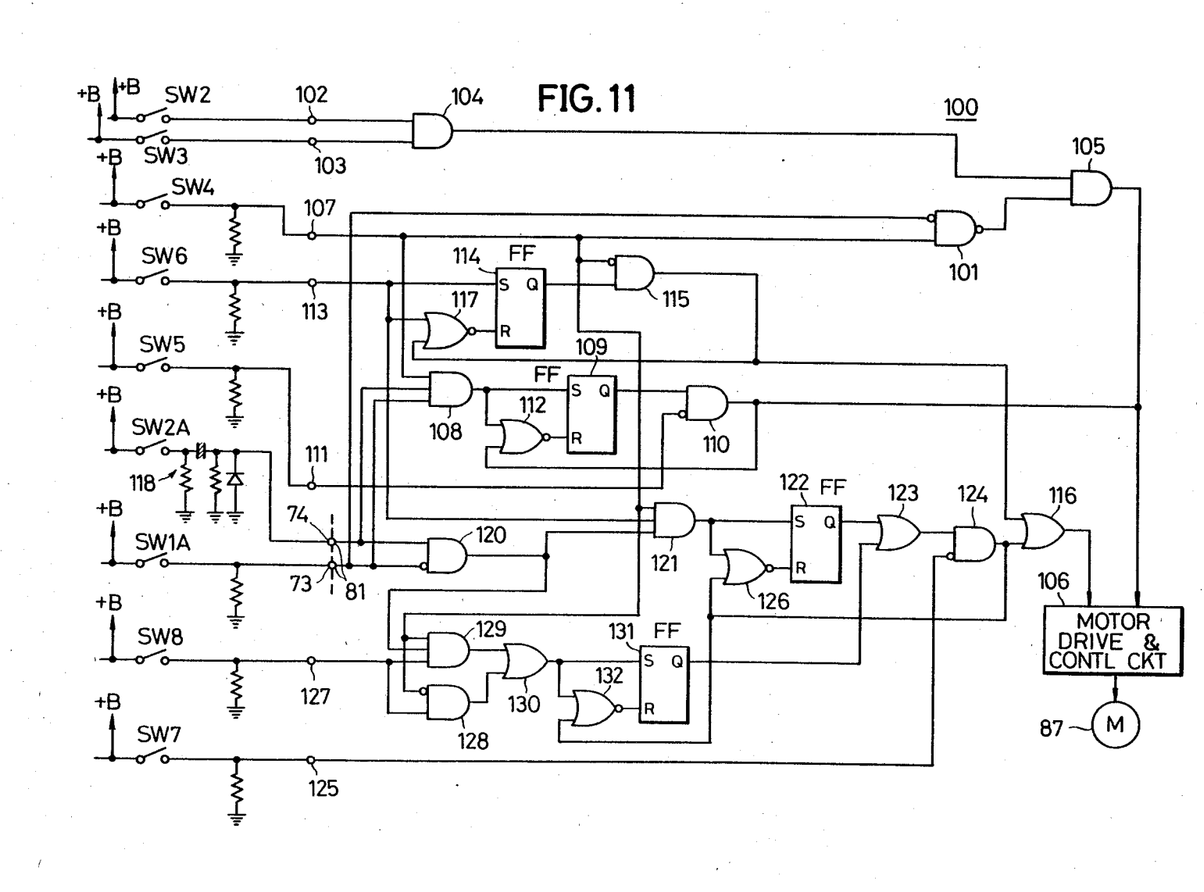
FIG. 11 is a circuit diagram showing an example of a control circuit for controlling the operation of the automatic adapter loading and unloading mechanism.

A control circuit 100 shown in FIG. 11 for controlling the operation of the loading and unloading mechanism 21, is provided in the apparatus 10. Description on the construction and operation of the control circuit 100 will be given later on in the specification.

Figure 5:
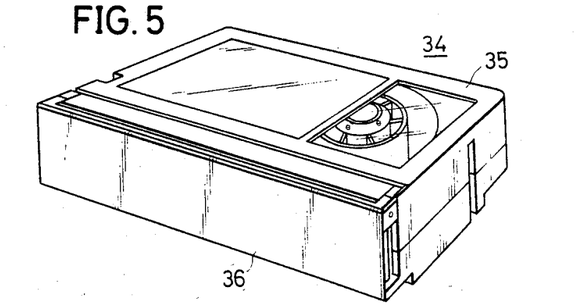
FIG. 5 is a perspective view showing an example of the miniature type tape cassette which is accommodated within the adapter shown in FIG. 4.
Figure 7:
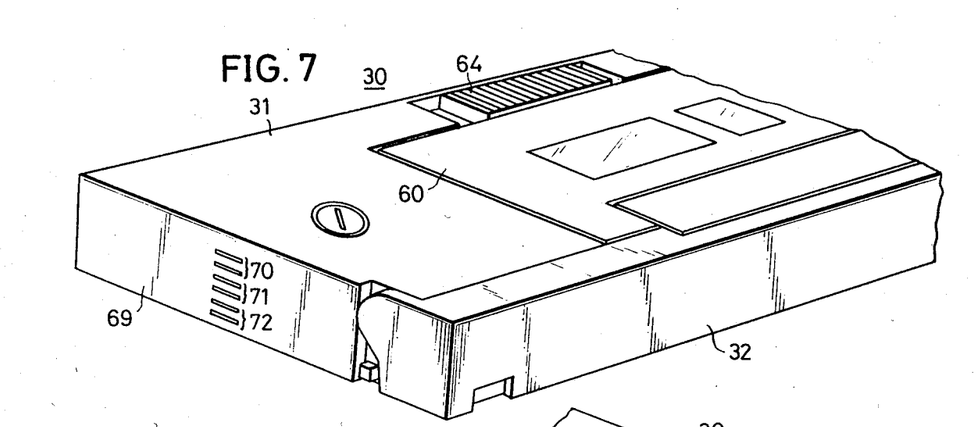
FIGS. 7 and 8 are perspective views, respectively showing the adapter shown in FIG. 4 from the right side thereof and from the left side thereof.
Figure 8:
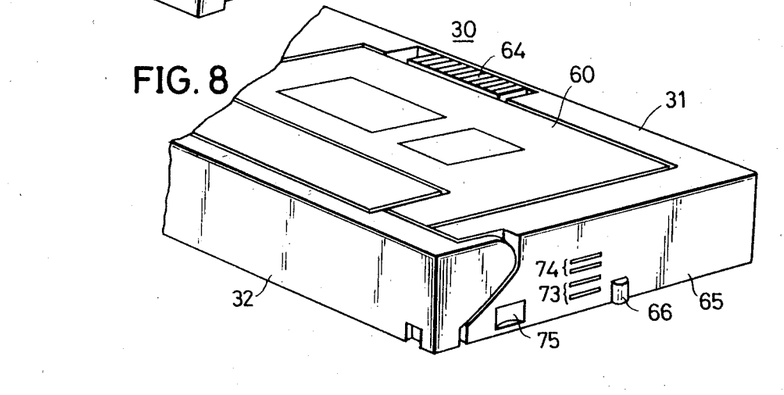

FIGS. 4, 7, and 8 show the adapter 30 for accommodating the miniature type tape cassette. This adapter 30 which is loaded into the apparatus 10, comprises an adapter case 31, a front lid 32, and an accommodating part 33 for accommodating the miniature type tape cassette. The adapter 30 has an external shape and form which are approximately the same as those of a standard type tape cassette. FIG. 5 shows a miniature type tape cassette 34 which is accommodated within the accommodating part 33 of the adapter 30. The miniature type tape cassette 34 is smaller than the standard type tape cassette, and comprises a cassette case 35 which accommodates a magnetic tape, and a lid 36 disposed at the front of the cassette case 35. Normally, the lid 36 is closed so as to protect the magnetic tape accommodated within the cassette case 35.

The adapter 30 is designed to perform a tape loading operation by use of a motor 37 which is built within the adapter 30. In other words, when the motor 37 rotates in a forward direction, the driving force of the motor 37 is transmitted to a gear 40 through a worm 38 and a gear system 39. Hence, the gear 40 rotates clockwise in FIG. 4 together with an arm 41 and a switching cam 42 which are integrally formed on the gear 40. A special chain 44 is taken up as the arm 41 rotates, and a loading arm 45 rotates clockwise about a pin 46 up to a position indicated by a two-dot chain line in FIG. 4. The rotation of the arm 45 is transmitted to a loading arm 51, through a bell crank lever 47, a link 48, a bell crank lever 49, and a link 50. As a result, the loading arm 51 rotates counterclockwise in FIG. 4 about a pin 52, up to a position indicated by a two-dot chain line in FIG. 4.

As the loading arms 45 and 51 rotate, poles 53 and 54 intercept and draw out a magnetic tape 55 from the miniature type tape cassette 34 which is accommodated within the accommodating part 33. By this tape loading operation within the adapter 30, a tape path 56 is formed at the front of the adapter 30. This tape path 56 corresponds to the tape path at the front of the standard type tape cassette.

On the other hand, when the motor 37 rotates in a reverse direction, each of the members described above operate in directions which are opposite to the operating directions at the time of the tape loading operation. Thus, the loading arm 45 rotates counterclockwise, and the loading arm 51 rotates clockwise in FIG. 4. Further, a take-up reel 58 within the miniature type tape cassette 34 rotates in a tape take-up direction due to the rotation of a gear 61. Therefore, a tape unloading operation is performed within the adapter 30, and the tape 55 forming the tape path 56 at the front of the adapter 30 is recovered within the miniature type tape cassette 34.

A locking member 59 which operates together with the link 48, locks a top cover 60 which covers the accommodating part 33 of the adapter 30, so that the top cover 60 does not open in a state where the tape 55 is drawn outside the miniature type tape cassette 34.

Figure 6:
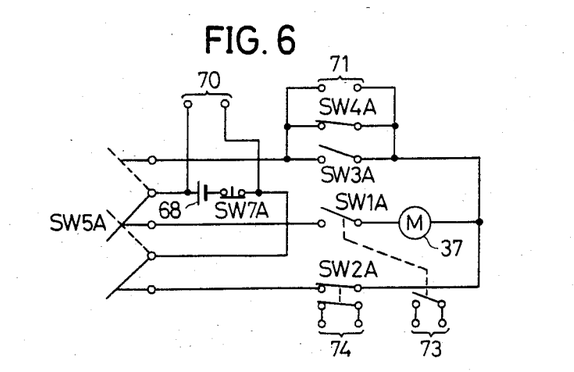
FIG. 6 is a circuit diagram showing connections between a motor within the adapter shown in FIG. 4 and a plurality of detecting switches.

Switches which will be described hereinafter, are provided within the adapter 30 in relation to the motor 37. The switches are coupled as shown in FIG. 6. The switches which are provided within the adapter 30, are designated by a reference numeral with a subscript "A". A switch SW1A detects whether the miniature type tape cassette 34 is accommodated within the accommodating part 33 of the adapter 30, and this switch SW1A is closed by a lever 63 when the miniature type tape cassette 34 is accommodated within the accommodating part 33. A switch SW2A detects whether the top cover 60 is closed, and this switch SW2A is closed when the top cover 60 is closed. A switch SW3A starts the tape unloading operation, and this switch SW3A is pushed and closed by a stopper 64a which is integrally formed on a sliding knob 64 when the knob 64 is slid in the direction of an arrow X1 up to a position where the knob 64 is locked. The knob 64 is locked at the slid and operated position by a locking member (not shown), and the switch SW3A is also kept in the closed state. A switch SW4A is a supplemental switch with respect to the switch SW3A, and closes when the loading arm 45 starts to rotate counterclockwise from the tape draw-out position indicated by the two-dot chain line in FIG. 4. The supplemental switch SW4A is coupled in parallel to the switch SW3A. As will be described later on in the specification, the supplemental switch SW4A closes after the tape unloading operation is started, so that a motor drive and control circuit remains inoperative even when the switch SW3A opens immediately before the tape unloading operation is completed. Concretely speaking, the supplemental switch SW4A is normally closed. The supplemental switch SW4A is pushed and opened by the loading arm 45 when the loading arm 45 rotates up to the position where the tape draw-out operation is completed, and is closed when the loading arm 45 rotates counterclockwise and is released from the engagement with the loading arm 45. A switch SW5A detects whether the tape loading operation or the tape unloading operation is completed. When the tape unloading operation is completed, the switch SW5A is switched as indicated by a solid line in FIG. 6 by the switching cam 42 described before. The switch SW5A is switched as indicated by a phantom line in FIG. 6 by the switching cam 42, when the tape loading operation is completed. A switch SW6A detects whether the tape loading operation is completed, and is closed by the switching cam 42 when the tape loading operation is completed. A switch SW7A switches a power source, and is normally closed. The switch SW7A opens when the adapter 30 is inserted into the adapter housing 21 and a projection 66 shown in FIG. 8 which projects from a left wall 65 of the adapter case 31 is inserted within the adapter case 31 against a force exerted by a spring 67, so as to disconnect a battery 68 within the adapter 30 from a motor circuit which includes the motor 37.

A plurality of terminals are exposed at the right and left walls 65 and 69 of the adapter case 31, as shown in FIGS. 7 and 8. The terminals are arranged in the thickness (height) direction of the adapter case 31. As will be described later on in the specification, the terminals make contact with respective contact groups of the adapter housing 21 when the adapter 30 is inserted into the adapter housing 21. As shown in FIGS. 3 and 7, a power source input terminal 70, an input terminal 71 for a tape unloading start signal, and an output terminal 72 for a tape loading completion detection signal, are arranged in this sequence from the top on the right wall 69 of the adapter case 31. The terminal 71 forms a circuit which is coupled in parallel with the switch SW3A as shown in FIG. 6, when the adapter housing 21 returns to the position C as will be described later on in the specification. The terminal 72 is provided in relation to the switch SW6A, and a tape loading completion signal is produced through the terminal 72 when the switch SW6A is closed.

As shown in FIG. 8, output terminals 73 and 74 are provided on the left wall 65 of the adapter case 31. A signal which indicates that there is a miniature type tape cassette accommodated within the adapter 30, is produced through the output terminal 73 when the switch SW1A closes. A signal which indicates that the top cover 60 of the adapter 30 is closed, is produced through the output terminal 74 when the switch SW2A closes. A depression 75 for discriminating the adapter, is formed on the left wall 65.

Next, description will be given with respect to the operation of the apparatus 10 when the adapter 30 is used, by referring to FIGS. 11 and 12(A) through 12(I).

Figure 12:
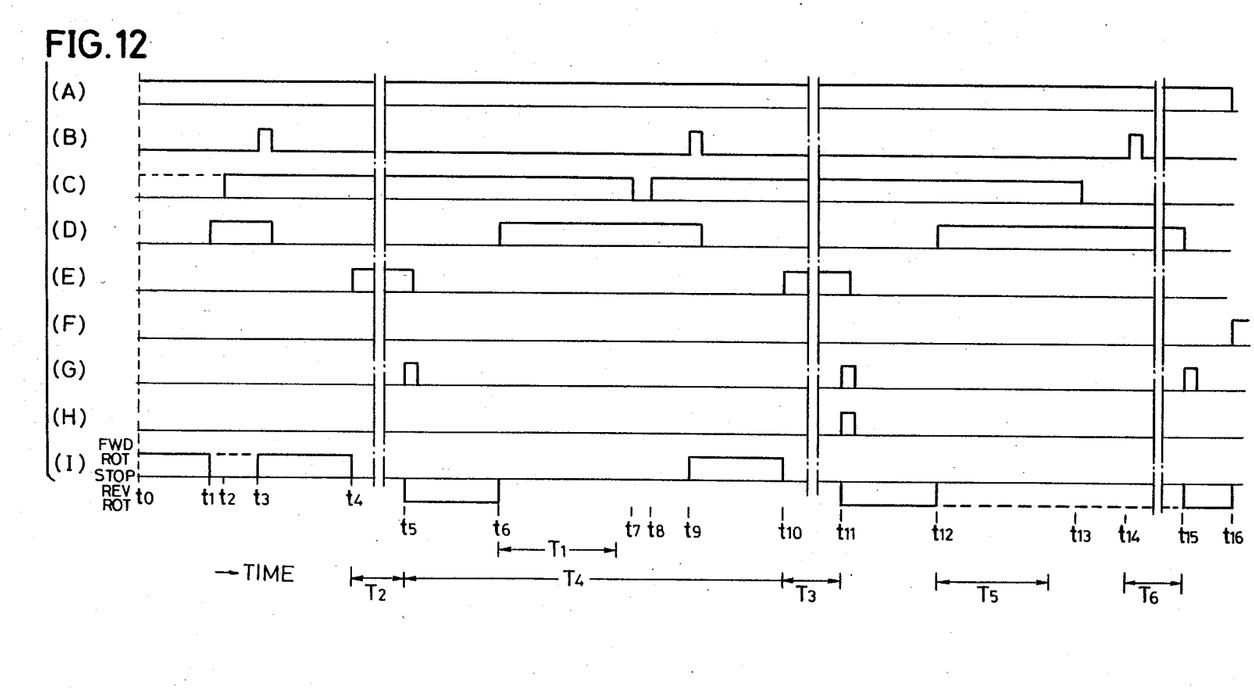

First, a power source switch 80 of the apparatus 10 is turned ON, and an empty adapter 30 which does not accommodate a miniature type tape cassette 34, is inserted through the inserting opening 12 of the apparatus 10. In the empty adapter 30, the switch SW1A is open, and the signal level is low at the terminal 73. The empty adapter 30 is pushed in the direction of an arrow Y1, and is inserted into the adapter housing 21 up to a position indicated by a one-dot chain line in FIGS. 2 and 3. This state corresponds to a time $t_0$ shown in FIG. 12. In this state, the terminals 71 through 73 and the terminals 74 and 75 on both sides of the adapter 30, make contact with contact groups 82 and 81 which are provided on the inner surfaces of the right and left side plates 25 and 24 of the housing 21. As a result, the adapter 30 and the apparatus 10 become electrically connected. The low-level signal at the terminal 73, is applied to one input terminal of a NAND gate 101. A low-level signal is applied to the other input terminal of the NAND gate 101, and the NAND gate 101 produces a high-level signal. In addition, the tip end of an adapter detecting lever 83 enters within the depression 75 described before, and the adapter detecting lever 83 is rotated counterclockwise by a torsion coil spring 84. Thus, an adapter detecting switch SW1 closes, and it is detected that the adapter 30 has been inserted into the adapter housing 21. Further, the lid 32 of the adapter 30 pushes slide plates 85 and 86 which are slidably provided on the bottom plate 26. As a result, the slide plates 85 and 86 slide slightly in the direction of the arrow Y1, and a rotary arm (not shown) rotates so as to close adapter insertion detecting switches SW2 and SW3 which are mounted on respective side plates 24 and 25. When the detecting switches SW2 and SW3 close, a signal shown in FIG. 12(A) is applied to an AND gate 104, through terminals 102 and 103, and the output level of the AND gate 104 becomes high. Consequently, the output level of an AND gate 105 becomes high, and a motor drive and control circuit 106 starts to operate. Hence, the motor 87 starts to rotate in the forward direction, as shown in FIG. 12(I).

Figure 9:
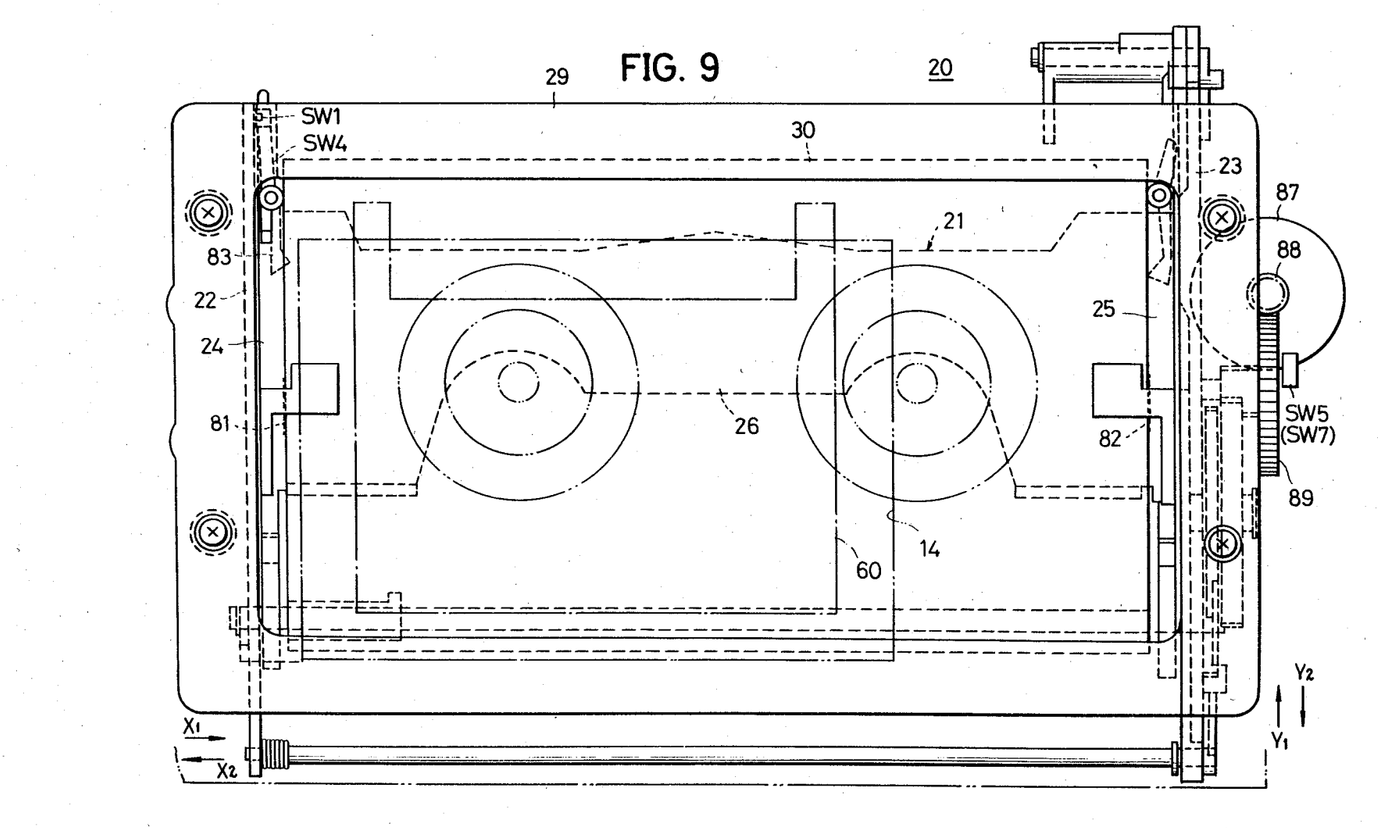
FIGS. 9 and 10 are a plan view and a side view, respectively showing an automatic adapter loading and unloading mechanism, in a state where an adapter housing assumes a position for accommodating and removing the miniature type tape cassette.

When the motor 87 rotates in the forward direction, the driving force of the motor 87 is transmitted to the pinion 27, through a worm 88, a worm wheel 89, gears 90 and 91, and the like. Thus, the pinion 27 is rotated clockwise. As a result, the adapter housing 21 moves in the direction of the arrow Y1 together with the adapter 30 which is inserted into the adapter housing 21 The adapter housing 21 further moves obliquely upwards, and the adapter 30 is drawn into the apparatus 10. When the adapter housing 21 reaches the position C shown in FIGS. 9 and 10, the side plate 24 makes contact with a position detecting switch SW4 which is mounted obliquely to the support plate 22. Therefore, the switch SW4 is closed at a time $t_1$ shown in FIG. 12. When the switch SW4 closes, the signal level at a terminal 107 becomes high as shown in FIG. 12(D), and the NAND gate 101 closes. The output level of the AND gate 105 becomes low, and the operation of the circuit 106 is stopped. Consequently, the motor 87 stops rotating as shown in FIG. 12(I). The adapter housing 21 stops at the position C together with the adapter 30. The adapter housing 21 remains in the position C until a predetermined operation is performed.

Thereafter, the operator opens the cover 15 on the top plate 13 of the apparatus 10, up to a position where the cover 15 becomes vertical to the top plate 13. As a result, the opening 14 becomes exposed, and the top cover 60 of the adapter 30 is positioned immediately below the opening 14. Next, when the operator inserts his finger through the opening 14 and slides the knob 64 of the adapter 30 in the direction of the arrow X1, the top cover 60 is released from its locked state and opens. The top cover 60 rotates up to a position where the top cover 60 becomes substantially vertical, due to the action of the torsion coil spring 76. In this state, the miniature type tape cassette 34 is inserted through the opening 14, and is accommodated within the accommodating part 33 of the adapter 30.

After the miniature type tape cassette 34 is accommodated within the accommodating part 33 at a time $t_2$, the top cover 60 is closed at a time $t_3$, and the cover 15 is closed subsequently.

When the miniature type tape cassette 34 is accommodated within the accommodating part 33, the switch SW1A closes, and the output level at the terminal 73 becomes high as shown in FIG. 12(C). When the top cover 60 is closed, the detecting switch SW2A closes, and a pulse signal shown in FIG. 12(B) is produced from a differentiating circuit 118 and is obtained through the terminal 74.

In this state, the switch SW4 is closed, and the output level at the terminal 107 is high. Hence, when the switches SW1A and SW2A close, inputs of an AND gate 108 all assume a high level, the AND gate 108 accordingly opens. As a result, a flip-flop circuit 109 is set, and a high-level signal from the flip-flop circuit 109 is applied to one input terminal of an AND gate 110. In this state, a detecting switch SW5 which closes when the adapter 30 is loaded into the apparatus 10 so as to detect that the adapter 30 has been loaded into the apparatus 10, is open. Moreover, the output level at a terminal 111 is low, and this low-level signal from the terminal 111 is inverted into a high-level signal and applied to the other input terminal of the AND gate 110. For this reason, when the flip-flop circuit 109 is set, the AND gate 110 opens and a high-level signal is obtained from the AND gate 110. This high-level signal from the AND gate 110 is applied to the motor drive and control circuit 106 so as to operate the motor drive and control circuit 106, and the motor 87 re-starts to rotate in the forward direction as shown in FIG. 12(I). In other words, when the miniature type tape cassette 34 is accommodated within the accommodating part 33 and the top cover 60 is closed in a state where the adapter housing 21 assumes the position C, the tape loading operation is performed within the adapter 30, and the adapter housing 21 moves downwardly in the direction of an arrow Z2 towards the position B. At a time $t_4$, the adapter 30 is loaded into the apparatus 10 as indicated by a two-dot chain line in FIGS. 2 and 3, in a state where the tape loading operation has been completed. When the adapter 30 is loaded into the apparatus 10, the detecting switch SW5 is closed by a pin on the worm wheel 89, and the output level at the terminal 111 becomes high as shown in FIG. 12(E). In addition, the AND gate 110 closes, the motor drive and control circuit 106 stops operating, and the motor 87 stops rotating. Further, the output level of a NOR gate 112 becomes high due to the closing of the detecting switch SW5, and the flip-flop circuit 109 is accordingly reset.

At a point when the tape loading operation within the adapter 30 is completed, the switch SW5A switches as indicated by a phantom line in FIG. 6, and the motor 37 stops rotating.

When a play button 92 is manipulated in this state, the tape 55 is drawn out of the adapter 30 and is loaded in a predetermined tape path in contact with a drum (not shown). The reproduction is carried out while the tape 55 moves in this predetermined tape path. A recording is carried out when the play button 92 and a recording button 93 are manipulated simultaneously.

A first eject button 94 is manipulated when changing the miniature type tape cassette 34 which is accommodated within the accommodating part 33. When the first eject button 94 is manipulated at a time $t_5$, a switch SW6 closes, and a high-level signal shown in FIG. 12(G) is applied to a terminal 113 to set a flip-flop circuit 114. A high-level signal is produced from a Q-output terminal of the flip-flop circuit 114, and is applied to one input terminal of an AND gate 115. On the other hand, the switch SW4 is open, and the output level at the terminal 107 is low. This low-level signal from the terminal 107 is inverted into a high-level signal and is applied to the other input terminal of the AND gate 115. For this reason, the AND gate 115 opens due to the manipulation of the first eject button 94, and a high-level signal is obtained from the AND gate 115. The high-level signal from the AND gate 115 is applied to an OR gate 116. The OR gate 116 produces a high-level signal which is applied to the motor drive and control circuit 106 so as to operate the motor drive and control circuit 106. As a result, the motor 87 starts to rotate in the reverse direction as shown in FIG. 12(I). When the motor 87 rotates in the reverse direction, the adapter housing 21 moves upwardly in the direction of an arrow Z1 up to the position C, together with the adapter 30. Thus, the adapter 30 becomes unloaded from the loaded position within the apparatus 10, and the switch SW4 closes at a time $t_6$. When the switch SW4 closes, the output level at the terminal 107 becomes high as shown in FIG. 12(D), and the AND gate 115 closes. The output level of the OR gate 116 becomes low, the operation of the motor drive and control circuit 106 stops, and the motor 87 stops rotating. In addition, a relay circuit (not shown) operate in response to the closing of the switch SW4, and a circuit in parallel with the switch SW3A is formed through the terminal 71 in FIG. 6. The motor 37 rotates in the reverse direction.

Accordingly, the adapter 30 stops at the position C, and the tape unloading operation is automatically performed within the adapter 30. In FIG. 12, an interval T1 represents an interval in which the tape unloading operation is performed.

The output level of a NOR gate 117 becomes high in response to the closing of the switch SW4, and the flip-flop circuit 114 is reset by the high-level signal from the NOR gate 117.

In a final stage of the tape unloading operation within the adapter 30, the locking with respect to the top cover 60 is released, and the top cover 60 opens to the vertical state due to the action of the spring 76. Further, the cover 15 is pushed by the top cover 60, and is opened automatically.

In this state, the operator inserts his hand into the opening 14, and removes the miniature type tape cassette 34 from the accommodating part 33 at a time $t_7$. The operator changes the miniature type tape cassette to be played, by inserting a different miniature type tape cassette within the accommodating part 33 at a time $t_8$. Next, when the top cover 60 is closed at a time $t_9$, the switches SW1A and SW2A close. Hence, the motor 37 shown in FIG. 6 starts to rotate, and the tape loading operation is performed within the adapter 30 which accommodates the different miniature type tape cassette. Similarly as in the case where the miniature type tape cassette 34 was initially inserted within the accommodating part 33, the AND gate 108 opens in response to the closing of the switches SW1A and SW2A, and the flip-flop circuit 109 is set. Moreover, the AND gate 110 opens, and the motor drive and control circuit 106 starts to operate. As a result, the motor 87 starts to rotate in the forward direction as shown in FIG. 12(I). Therefore, the adapter housing 21 moves downwardly in the direction of an arrow Z2 towards the position B. The tape loading operation is performed within the adapter 30 as the adapter 30 moves downwardly, and the adapter 30 is loaded into the apparatus 10 as indicated by the two-dot chain line in FIGS. 2 and 3 at a time $t_{10}$. When the adapter 30 is loaded into the apparatus 10, the switch SW5 closes, and the motor 87 stops rotating.

Accordingly, the operator only has to change the miniature type tape cassette and close the top cover 60, and it is unnecessary to perform a special operation to start an operation in which the adapter housing 21 is moved towards the position B. The apparatus 10 can thus be operated with ease.

When the tape loading operation within the adapter 30 is completed, the switch SW5A switches as indicated by the phantom line in FIG. 6 and the motor 37 stops rotating, as in the case described previously.

The different miniature type tape cassette can be played to carry out a reproduction or a recording, by manipulating the play button 92 or by manipulating the play button 92 and the recording button 93 simultaneously. In FIG. 12, intervals T2 and T3 respectively represent intervals in which the recording or reproduction is carried out.

Therefore, the removal of the miniature type tape cassette 34 from the adapter 30 and the insertion of the miniature type tape cassette 34 into the adapter 30, are performed through the opening 14 in a state where the adapter 30 is inside the apparatus 10. Thus, it is unnecessary to perform the troublesome operation of extracting the adapter 30 outside the apparatus 10 every time the miniature type tape cassette 34 is to be changed. An interval T4 in which the recording or reproduction is interrupted, between a time when the recording or reproduction with respect to one miniature type tape cassette is completed and a time when the recording or reproduction with respect to another miniature type tape cassette is started, is an interval between the times $t_5$ and $t_{10}$. The interval T4 is effectively reduced compared to the interval in which the recording or reproduction is interrupted in the conventional apparatus.

When the first eject button 94 is manipulated at a time $t_{11}$ as in the case described previously, after the recording or reproduction is completed with respect to the last of a plurality of miniature type tape cassettes 34 which are played, the motor 87 rotates in the reverse direction as in the case described previously. The adapter housing 21 reaches the position C at a time $t_{12}$. The switch SW4 closes, and the motor 87 stops rotating. The tape unloading operation is performed within the adapter 30 within an interval T5, and the last miniature type tape cassette 34 is removed from the adapter 30 at a time $t_{13}$. This time, the top cover 60 is closed in a state where the adapter 30 remains empty.

In this case, the level at the terminal 73 becomes low, and the level at the terminal 74 becomes high. The signals from the terminals 73 and 74 are respectively applied to an AND gate 120 through the contact group 81. Hence, the AND gate 120 produces a high-level signal, and applies this high-level signal to a first input terminal of a 3-input AND gate 121. The high-level signal from the terminal 107 is applied to a second input terminal of the AND gate 121, however, a low-level signal is applied to a third input terminal of the AND gate 121. As a result, the AND gate 121 remains closed, the output level of the OR gate 116 remains low, and the motor 87 does not rotate. Hence, the adapter housing 21 remains at the position C, and the empty adapter 30 is kept within the apparatus 10. In other words, the apparatus 10 is used to keep the empty adapter 30.

Therefore, when playing a miniature type tape cassette 34 in a state where the empty adapter 30 is kept within the apparatus 10, it is only necessary to open the cover 15 and the top cover 60 and insert the miniature type tape cassette 34 within the accommodating part 33 through the opening 14. Accordingly, it is unnecessary to perform a troublesome operation of bringing the adapter 30 from a storage location, and it is convenient for the operator. In FIG. 12, an interval T6 represents an interval in which the empty adapter 30 is kept within the apparatus 10.

In a case where the empty adapter 30 is to be extracted from the apparatus 10, the first eject button 94 is manipulated again at an arbitrary time $t_{15}$. Responsive to this manipulation of the first eject button 94, a high-level signal from the terminal 113 is applied to the AND gate 121. The AND gate 121 opens, and a flip-flop circuit 122 is set. The Q-output of the flip-flop circuit 122 is applied to an OR gate 123, and an output signal of the OR gate 123 is applied to one input terminal of an AND gate 124. A signal from a terminal 125, which assumes a high level when a tape cassette ejecting operation is completed, is inverted and applied to the other input terminal of the AND gate 124. In a state where the adapter 30 is inside the apparatus 10, the signal level is high at this other input terminal of the AND gate 124. For this reason, the AND gate 124 opens responsive to the output signal of the OR gate 123, and produces a high-level signal which is applied to the OR gate 116. As in the case described before, the motor drive and control circuit 106 starts to operate, and the motor 87 starts to rotate in the reverse direction as shown in FIG. 12(I). Accordingly, the adapter housing 21 moves in the direction of an arrow Y2 to return to the position A, and the empty adapter 30 is ejected outside the apparatus 10.

When the loading and unloading mechanism 20 operates to a final state in which the empty adapter 30 is ejected outside the apparatus 10, a detecting switch SW7 for detecting the completion of an adapter ejecting operation, is engaged and closed by the pin on the worm wheel 89. The detecting switch SW7 closes at a time $t_{16}$. As shown in FIG. 12(F), the signal from the terminal 125 assumes a high level, and the AND gate 124 closes to produce a low-level signal. Moreover, the motor drive and control circuit 106 stops operating, and the motor 87 stops rotating. In addition, a NOR gate 126 produces a high-level signal, and the flip-flop circuit 122 is reset.

Next, description will be given with respect to the operation of the apparatus 10 in a case where a second eject button 95 is manipulated instead of the first eject button 94.

When the second eject button 95 is manipulated at a time $t_{11}$, a switch SW8 closes, and a high-level signal shown in FIG. 12(H) is applied to a 2-input AND gate 128 and to a 3-input AND gate 129 from a terminal 127. The signal from the terminal 107 is applied to the other input terminal of the AND gate 128. Further, the signal from the terminals 107 and the signal from the AND gate 120, are supplied to the other two input terminals of the AND gate 129.

When the second eject button 95 is manipulated in a state where the adapter 30 is loaded into the apparatus 10, the AND gate 128 opens, and a flip-flop circuit 131 is set by an output signal of an OR gate 130. A Q-output of the flip-flop circuit 131 is applied to the OR gate 123. Hence, as in the case described before, the motor drive and control circuit 106 is operated through the OR gate 123, the AND gate 124, and the OR gate 116. The motor 87 rotates in the reverse direction, and the adapter housing 21 moves upwardly in the direction of the arrow Z1 together with the adapter 30. When the adapter housing 21 reaches the position C, the switch SW4 closes. However, the flip-flop circuit 131 is not reset, and is maintained in the set state. For this reason, the motor 87 does not stop rotating, but continues to rotate in the reverse direction as indicated by a phantom line in FIG. 12(I). As a result, the adapter housing 21 moves in the direction of the arrow Y2 to the position A, and the adapter 30 is ejected through the inserting opening 12 of the apparatus 10. When the adapter housing 21 returns to the position A, the switch SW7 closes at a time $t_{16}$, and the signal from the terminal 125 assumes a high level. The AND gate 124 closes, and produces a low-level signal. Accordingly, as in the case described before, the motor 87 stops rotating, and a NOR gate 132 produces a high-level signal to reset the flip-flop circuit 131.

Thus, the second eject button 95 is useful when manipulated after the last of the plurality of miniature type tape cassettes has been played, or when a single miniature type tape cassette has been played, for example.

The adapter 30 is extracted through the inserting opening 12 of the apparatus 10, after the tape unloading operation is completed within the adapter 30. In a case where the adapter 30 is extracted through the inserting opening 12 immediately when the adapter housing 21 reaches the position A, the supply of electrical power to the adapter 30 from the apparatus 10 is cut off. However, the projection 66 projects and the switch SW7A closes when the adapter 30 is extracted from the adapter housing 21. As a result, the motor 37 continues to rotate in a state powered by the battery 68, and the tape unloading operation continues to be performed within the adapter 30. In the final stage of the tape unloading operation, the top cover 60 is released from its locked state and opens. The switch SW3A opens responsive to the release of the top cover 60 from its locked state. However, the motor 37 does not stop rotating because the switch SW4A is closed at this point, and the tape unloading operation is performed until it is completed. The switch SW5A is switched over when the tape unloading operation is completed within the adapter 30, and the motor 37 stops rotating.

In a case where the second eject button 95 is manipulated in a state where the empty adapter 30 is accommodated within the adapter housing 21 which is stationary at the position C, the AND gate 129 closes instead of the AND gate 128, and the flip-flop circuit 131 is set through the OR gate 130. As in the case described before, the motor 87 rotates in the reverse direction, and the adapter housing 21 moves in the direction of the arrow Y2 to eject the adapter 30 out of the apparatus 10. When the adapter 30 is ejected out of the apparatus 10, the motor 87 stops rotating as in the case described before, and the flip-flop circuit 131 is reset.

Next, description will be given with respect to a case where an adapter 30 accommodating a miniature type tape cassette 34 is inserted into the apparatus 10.

When the miniature type tape cassette 34 is accommodated within the accommodating part 33 of the adapter 30 and the top cover 60 is closed, the motor 37 is powered by the battery 68 and rotates so as to perform the tape loading operation within the adapter 30. In a state where the tape path 56 is formed at the front of the adapter 30, the switch SW6A is closed, and the tape loading completion detection signal is produced through the terminal 72.

A high-level signal indicated by a phantom line in FIG. 12(C) which indicates that a miniature type tape cassette is accommodated within the adapter 30, is produced through the terminal 73 when the miniature type tape cassette 34 is accommodated within the adapter 30.

When the adapter 30 accommodating the miniature type tape cassette 34 is inserted into the adapter housing 21, the AND gate 104 and the NAND gate 101 respectively produce a high-level signal. Thus, the AND gate 105 produces a high-level signal to operate the motor drive and control circuit 106, and the motor 87 starts to rotate in the forward direction. By this forward rotation of the motor 87, the adapter housing 21 moves in the direction of the arrow Y1 together with the adapter 30 as in the case described before, and the adapter 30 is drawn into the apparatus 10. When the adapter housing 21 reaches the position C shown in FIGS. 9 and 10, the switch SW4 closes at a time $t_1$, and the signal level at the terminal 107 becomes high. However, since the signal level at the terminal 73 is high, the output level of the NAND gate 101 remains high. Accordingly, the output level of the AND gate 105 does not change and remains high, and the motor drive and control circuit 106 is maintained in the operating state. Thus, the motor 87 does not stop but continues to rotate as indicated by the phantom line in FIG. 12(I). Therefore, unlike in the case where the empty adapter 30 is inserted into the adapter housing 21, the adapter housing 21 moves to the position B to load the adapter 30 into the apparatus 10, without stopping at the position C.

In a case where the miniature type tape cassette 34 is simply accommodated within the accommodating part 33 of the adapter 30 and this adapter 30 in which the tape loading operation has not been performed is inserted into the adapter housing 21 through the inserting opening 12, the motor 87 rotates in the forward direction and the adapter housing 21 moves towards the position C together with the adapter 30. When this adapter 30 is inserted into the adapter housing 21, the motor 37 is powered by the power source of the apparatus 10 through the terminal 70, so as to perform the tape loading operation within the adapter 30. In other words, the adapter housing 21 moves in the direction of the arrow Y1 while the tape loading operation is performed within the adapter 30. The tape loading operation is completed within the adapter 30 by the time the adapter housing 21 reaches the position C, and the adapter housing 21 moves to the position B so as to load the adapter 30 into the apparatus 10, without stopping at the position C.

In a case where the standard type tape cassette is inserted into the adapter housing 21 through the inserting opening 12, the detecting lever 83 is pushed and rotated by the side surface of the standard type tape cassette, and the switch SW1 opens. Accordingly, the adapter housing 21 moves to the position B so as to load the standard type tape cassette into the apparatus 10, without stopping at the position C, similarly as in the case where the adapter 30 accommodating the miniature type tape cassette 34 is inserted into the adapter housing 21. When the tape cassette ejecting operation is performed, the adapter housing 21 returns directly to the position A, and the standard type tape cassette is ejected out of the apparatus 10.

In the embodiment described heretofore, when the miniature type tape cassette 34 is accommodated within the adapter 30 and the top cover 60 is closed in a state where the adapter housing 21 assumes the position C, the tape loading operation is performed within the adapter 30, and the loading operation with respect to the adapter 30 is carried out simultaneously therewith. However, the loading operation with respect to the adapter 30 may be carried out after the tape loading operation is completed within the adapter 30. In this case, the control circuit 100 is designed to drive the motor 87 responsive to a tape loading completion signal which is obtained from the terminal 72 when the switch SW6A closes.

Further, in the embodiment described heretofore, the tape unloading operation within the adapter 30 is started after the adapter housing 21 returns to the position C. However, a timing switch for starting the tape unloading operation may be provided so that this timing switch is closed before the adapter housing 21 returns to the position C, for example. In this case, the tape unloading operation is performed within the adapter 30 at an earlier time, and it is possible to shorten the waiting time from the time when the adapter 30 returns to the position C until the time when the tape unloading operation is completed within the adapter 30.

Next, description will be given with respect to an essential part of another embodiment of a magnetic recording and/or reproducing apparatus according to the present invention, by referring to FIG. 13.

Figure 13:
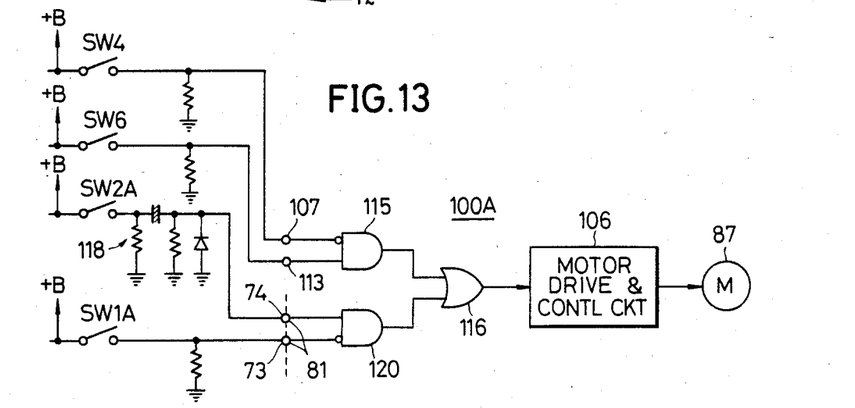
FIG. 13 shows a control circuit used in another embodiment of the magnetic recording and/or reproducing apparatus according to the present invention.

FIG. 13 shows an essential part of a control circuit 100A. In FIG. 13, those parts which are the same as those corresponding parts in FIG. 11 are designated by the same reference numerals. The control circuit 100A is assembled into a magnetic recording and/or reproducing apparatus which is identical to the apparatus 10 shown in FIG. 1 except that the second eject button 95 is omitted.

In order to change the miniature type tape cassette which is being played on the apparatus 10, the first eject button 94 is manipulated. Responsive to this manipulation of the first eject button 94, the switch SW6 closes, and a high-level signal is applied to one input terminal of the AND gate 115 from the terminal 113. A low-level signal from the terminal 107 is inverted and applied to the other input terminal of the AND gate 115. Accordingly, the AND gate 115 opens, and a high-level signal is produced from the OR gate 116 so as to operate the motor drive and control circuit 106 and rotate the motor 87 in the reverse direction. As a result, the adapter housing 21 reaches the position C together with the adapter 30.

Next, description will be given with respect to a case where the miniature type tape cassette 34 is removed from the adapter 30 and the top cover 60 is closed in a state where the adapter housing assumes the position C. When the miniature type tape cassette 34 is removed from the adapter 30 and the accommodating part 33 becomes empty, the switch SW1A opens. Hence, a low-level signal is obtained from the adapter 30 through the terminal 74 and the contact group 81. This low-level signal is inverted and applied to one input terminal of the AND gate 120 in the apparatus 10. In addition, when the top cover 60 is closed, the switch SW2A closes and a high-level signal is obtained from the adapter 30 through the terminal 74 and the contact group 81. This high-level signal is applied to the other input terminal of the AND gate 120 in the apparatus 10. As a result, the output level of the AND gate 120 becomes high, and the output level of the OR gate 116 also becomes high. Thus, the motor drive and control circuit 106 operates similarly as in the case described before, and the motor 87 rotates in the reverse direction. Therefore, the adapter housing 21 moves in the direction of the arrow Y2 back to the position A, and the empty adapter 30 is ejected out of the apparatus 10.

According to this second embodiment, it is only necessary to remove the miniature type tape cassette and close the cover 15, when the last of the plurality of miniature type tape cassettes has been played, for example, and it is unnecessary to perform a special operation to move the adapter housing 21 back to the position A. As a result, the operation of the apparatus 10 becomes simple and easy.

Further, the present invention is not limited to these embodiments, but various variations and modifications may be made without departing from the scope of the present invention.

What is claimed is:

1. A magnetic recording and/or reproducing apparatus for recording and/or reproducing a signal on and/or from a magnetic tape within a miniature type tape cassette which is smaller than a standard type tape cassette, when loaded with an adapter which has a shape approximately the same as the shape of said standard type tape cassette and accommodates therein said miniature type tape cassette, said recording and/or reproducing apparatus comprising:

an inserting opening through which said adapter is inserted;

an adapter housing for holding said adapter which is inserted through said inserting opening;

moving means for moving said adapter housing between a first position opposing said inserting opening and a second position where said adapter is loaded into said recording and/or reproducing apparatus, through a predetermined position;

control means for controlling the operation of said moving means, said control means stopping said adapter housing at said predetermined position; and an opening located at a position so as to enable access to said adapter housing in said predetermined position, said miniature type tape cassette being inserted into and removed from said adapter through said opening.

2. A recording and/or reproducing apparatus as claimed in claim 1 in which said opening is formed on a top plate of said recording and/or reproducing apparatus.

3. A recording and/or reproducing apparatus as claimed in claim 2 in which said opening has a cover which is pivotally supported nearer to the rear of said recording and/or reproducing apparatus, and said cover opens so as not to interfere with the insertion and removal of said miniature type tape cassette into and from said adapter.

4. A recording and/or reproducing apparatus as claimed in claim 1 in which said moving means comprises guide means for first horizontally moving said adapter housing from a vicinity of said inserting opening towards the rear of said recording and/or reproducing apparatus, secondly moving said adapter housing obliquely upwards towards the rear of said recording and/or reproducing apparatus up to said predetermined position in a vicinity of a top plate of said recording and/or reproducing apparatus, and thirdly moving said adapter housing downwardly to said second position so as to load said adapter into said recording and/or reproducing apparatus, and said opening is formed on said top plate so as to oppose said adapter housing in said predetermined position.

5. A recording and/or reproducing apparatus as claimed in claim 1 in which said adapter comprises an accommodating part for accommodating said miniature type tape cassette, a first detecting switch for detecting the accommodation of said miniature type tape cassette within said accommodating part, a cover for covering said accommodating part, and a second detecting switch for detecting the closure of said cover, said recording and/or reproducing apparatus further comprises electrical coupling means for electrically coupling said adapter held within said adapter housing to said control means, said moving means comprises a motor for moving said adapter housing towards said second position by rotating in a forward direction and for moving said adapter housing towards said first position by rotating in a reverse direction, and said control means comprises a control circuit for controlling and rotating said motor in the forward direction in response to open and closed states of said first and second detecting switches when said miniature type tape cassette is accommodated within said accommodating part of said adapter which is held within said adapter housing in said predetermined position and said cover is closed.

6. A recording and/or reproducing apparatus as claimed in claim 5 in which said control means further comprises a control circuit for controlling and stopping the rotation of said motor in response to open and closed states of said first and second detecting switches when said miniature type tape cassette is not accommodated within said accommodating part of said adapter which is held within said adapter housing in said predetermined position and said cover is closed in a state where said accommodating part is empty.

7. A recording and/or reproducing apparatus as claimed in claim 1 in which said adapter comprises an accommodating part for accommodating said miniature type tape cassette, a first detecting switch for detecting the accommodation of said miniature type tape cassette within said accommodating part, a cover for covering said accommodating part, and a second detecting switch for detecting the closure of said cover, said recording and/or reproducing apparatus further comprises electrical coupling means for electrically coupling said adapter held within said adapter housing to said control means, said moving means comprises a motor for moving said adapter housing towards said second position by rotating in a forward direction and for moving said adapter housing towards said first position by rotating in a reverse direction, and said control means comprises a control circuit for controlling and rotating said motor in the reverse direction in response to open and closed states of said first and second detecting switches when said miniature type tape cassette is not accommodated within said accommodating part of said adapter which is held within said adapter housing in said predetermined position and said cover is closed in a state where said accommodating part is empty.

8. A recording and/or reproducing apparatus as claimed in claim 1 which further comprises first and second manipulating means which are selectively manipulated when moving said adapter housing from said second position to said first position, said moving means comprises a motor for moving said adapter housing from said second position to said first position by rotating in a reverse direction, and said control means comprises a control circuit for controlling said motor so that said motor stops rotating in the reverse direction responsive to the manipulation of said first manipulating means when said adapter housing reaches said predetermined position, and said motor continues to rotate in the reverse direction responsive to the manipulation of said second manipulating means when said adapter housing reaches said predetermined position.

9. A recording and/or reproducing apparatus as claimed in claim 1 in which said adapter comprises an accommodating part for accommodating said miniature type tape cassette, a first detecting switch for detecting the accommodation of said miniature type tape cassette within said accommodating part, a cover for covering said accommodating part, and a second detecting switch for detecting the closure of said cover, said recording and/or reproducing apparatus further comprises electrical coupling means for electrically coupling said adapter held within said adapter housing to said control means, said moving means comprises a motor for moving said adapter housing towards said second position by rotating in a forward direction, and said control means comprises a control circuit for controlling said motor so that said motor stops rotating in the forward direction when said s comprises a control circuit for controlling said motor so that said motor stops rotating in the forward direction when said adapter housing reaches said predetermined position in a case where said adapter is inserted through said inserting opening in a state where said miniature type tape cassette is not accommodated within said adapter, and said motor continues to rotate in the forward direction even when said adapter housing reaches said predetermined position in a case where said adapter is inserted through said inserting opening in a state where said miniature type tape cassette is accommodated within said adapter.

* * * * *